March 18, 1952    H. ZENFTMAN ET AL    2,590,060
PROCESS FOR MANUFACTURE OF FUSES
AND COMPOSITION THEREFOR
Filed Feb. 6, 1948
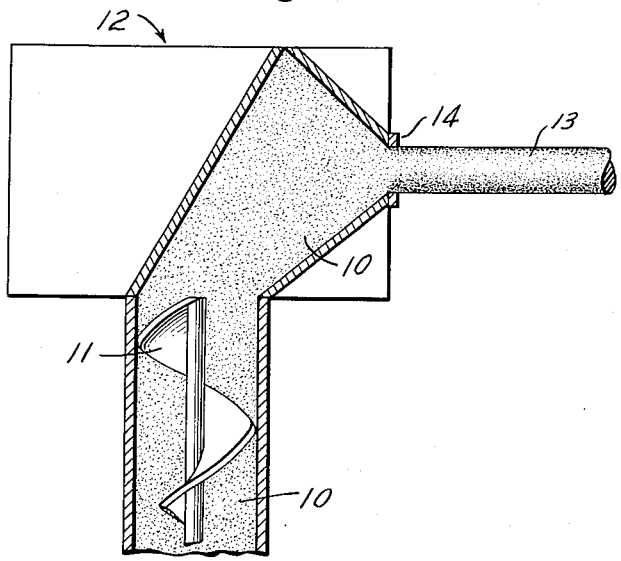
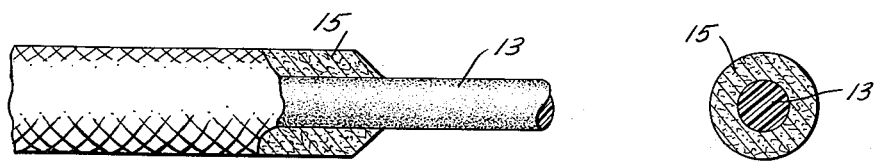
Inventors
HENRYK ZENFTMAN &
JOSEPH E. FORLIN
By Roy F Steward
Attorney

UNITED STATES PATENT OFFICE 2,590,060

PROCESS FOR MANUFACTURE OF FUSES AND COMPOSITION THEREFOR

Henryk Zenftman and Joseph E. Forlin, Saltcoats, Scotland, assignors to Imperial Chemical Industries Limited, a corporation of Great Britain Application February 6, 1948, Serial No. 6,827
In Great Britain May 7, 1947

7 Claims. (Cl. 52—2)

The present invention relates to the manufacture of fuses of the kind in which the core of self-combustible material enclosed in the envelope comprises a coherent rod of imporous romposition formed by extrusion of the composition in a thermoplastic condition.

In U. S. Patent No. 2,363,569 there is described and claimed inter alia a non-detonating safety fuse of the kind having a coherent imperforate extruded core of plastic material surrounded by an envelope of less combustible or incombustible material, whereof the core comprises a deflagrating mixture of normally pulverulent oxidising and reducing agents and a non-detonating binding agent therefor including colloidal nitrocellulose but free from nitroglycerine, the proportion by weight of said binding agent being not more than that of the mixture of oxidising and reducing agents.

For certain purposes it has since been found that particularly useful fuses, non-safety as well as safety fuses, are those wherein the core has been made from a thermoplastic composition in which the mixture of pulverulent oxidising and reducing agents is one comprising as reducing agent for example silicon or calcium silicide and as oxidising agent a lead compound thermally decomposable to yield products comprising lead monoxide and free oxygen and wherein the industrial nitrocellulose is plasticised by a non-volatile plasticising agent for nitrocellulose as for example dibutyl phthalate.

It has been found however that the rate of extrusion from an extrusion machine of such-like thermoplastic compositions when softened by heating to temperatures about 100° C. diminished with time and that eventually the flow of material ceased. The composition inside the extrusion machine was found to be hard and crumbly and incapable of being softened by further heating. The speed of hardening seemed to depend on the temperature of heating. For instance, heating for 45–60 minutes at 100° C. may cause the composition to harden sufficiently to prevent extrusion. As it seemed unlikely from the manner of heating that this temperature should cause the hardening observed it was suspected that comparatively large increases in the temperature of the composition may have been caused by friction and the work done by the worm. As the composition is sufficiently plastic at 80° C. for extrusion this temperature was then chosen for extrusion when an immediate improvement was obtained, the rate of extrusion however nevertheless fell with time. It was found that a small deposit adhered to the rough parts of the worm of the extrusion machine and that this hardened in the course of about an hour and tended to build up on the worm causing an increasing resistance to the flow of material. There was the possibility that after prolonged extrusion total blockage might occur. It was therefore essential to improve these plastic core compositions so as to prevent this hardening from taking place.

This gradual hardening of the thermoplastic nitrocellulose compositions under prolonged heating at raised temperatures was eventually attributed to the presence of the pulverulent lead compound oxidising agent.

It was subsequently experimentally ascertained that this gradual hardening could be prevented by the inclusion in the thermoplastic composition of the one or more water soluble polycarboxylic aliphatic acids, namely, crystalline citric acid, malonic acid, malic acid; potassium binoxalate ($KHC_2O_4.H_2O$); the high boiling solvent of ether-alcohol structure for nitrocellulose namely butyl ether of ethylene glycol ("Butyl Cellosolve").

The afore-mentioned reagents which prevent the gradual hardening at raised temperature of colloided nitrocellulose containing a pulverulent lead oxidising agent will be hereinafter referred to as "anti-hardening agents."

It is desirable that a weak base such as diphenylamine should be included in the thermoplastic composition.

The process according to the invention for the production of fuse of the kind having a coherent imperforate extruded core surrounded by an envelope of less combustible or incombustible material includes the step or extruding in the form of a core a heated thermoplastic composition comprising a deflagrating mixture of a reducing agent and a lead compound thermally decomposable to yield products comprising lead monoxide and free oxygen, a non-detonating binding agent therefor including nitrocellulose colloided by a non-volatile plasticizer, and one or more anti-hardening agents as herein defined.

According to the present invention a fuse of the kind having a coherent imperforate extruded core surrounded by an envelope of less combustible or incombustible material whereof the core comprises a deflagrating mixture of a reducing agent and a lead compound thermally decomposable to yield products comprising lead monoxide and free oxygen and a non-detonating binding agent therefor including nitrocellulose colloided by a non-volatile plasticizer is characterised in that the core composition includes one or more anti-hardening agents as herein defined.

The inclusion of crystalline citric acid has been found to be particularly useful.

It is desirable that the weight of anti-hardening agent as herein defined should be present in a quantity at least equal to 2% of the weight of the plasticized nitrocellulose.

The said thermoplastic nitrocellulose compositions become fluent at temperatures between 80° C. and 115° C.

Examples of suitable lead compounds are the higher oxides of lead as for example red lead and lead peroxide.

Substantially gasless mixtures can for instance be obtained from red lead and silicon, which desirably contain an excess of silicon up to about 25% over the stoichiometric proportions.

If desired these mixtures may be made non-gasless by the substitution of potassium nitrate or barium nitrate for a portion of the lead compound as the oxidising constituent of the mixture, wherein for example there may conveniently be present not less than 1.0 part red lead per part of potassium nitrate and an excess of silicon over the stoichiometric proportion.

A method of extrusion of the fuse core and a typical fuse produced in this manner are illustrated more or less diagrammatically in the accompanying drawings, wherein Fig. 1 illustrates the production of the fuse core by extrusion;

Fig. 2 is a side elevation of a fuse, on an enlarged scale, partly broken away and in section; and Fig. 3 is a cross section of the fuse shown in Fig. 2.

In the drawings, the heated thermoplastic composition 10 which consists of a prepared mixture of a reducing agent, a lead compound, a thermoplastic nitrocellulose material and an anti-hardening agent, is fed by the worm screw 11 into the extrusion machine 12 from which the extruded core 13 exits through a die 14 in the usual manner. The inclusion of an anti-hardening agent, such as crystalline citric acid, malonic acid, malic acid, potassium binoxalate, or butyl ether of ethylene glycol, in the thermoplastic composition 10 prevents the hardening of the nitrocellulose on the worm 11 thereby preventing resistance to the flow of material or eventual blockage of the extrusion machine. After the rod-like core is extruded, it is covered with a less combustible or incombustible material 15 in the usual manner.

By way of example the process of the invention is illustrated by exhaustive tests which were conducted in the following manner.

Thermoplastic compositions are prepared consisting of colloided nitrocellulose containing a lead compound of the aforesaid kind and 2% by weight of an anti-hardening agent as hereinbefore defined on the weight of the colloided nitrocellulose.

The said plastic core compositions consist more specifically of 79.6 parts by weight of a mixture of pulverulent powders of oxidising agents and reducing agents, 20.0 parts of colloided nitrocellulose and 0.4 part of an anti-hardening agent as hereinbefore defined. The mixture of pulverulent powders consists of red lead 41 parts, potassium nitrate 33 parts and silicon 26 parts. The colloided nitrocellulose consists of 50 parts nitrocellulose, 48 parts dibutyl phthalate and 2 parts diphenylamine.

These compositions are heated for 8 hours in an oven at a temperature between 90 and 100° C. After this prolonged heating the compositions are extruded through laboratory scale extrusion apparatus. The diameter of the die in the extrusion apparatus is 0.045" but smaller or larger diameters can be employed.

No indications of hardening are obtained during the extrusion of any of the above mentioned compositions.

We claim:

1. In the manufacture of fuse by a process which comprises intimately commingling with a deflagrating mixture of a reducing agent and a lead compound thermally decomposable to yield products comprising lead monoxide and free oxygen, a non-detonating thermoplastic material including nitrocellulose colloided by a non-volatile plasticizer, and extruding the thermoplastic composition so obtained in the form of a coherent, imperforate, rod-like core, the further step of adding an anti-hardening agent to the deflagrating mixture and the thermoplastic material for the purpose of preventing hardening of said thermoplastic composition during extrusion, said anti-hardening agent being selected from the group consisting of a water soluble polycarboxylic aliphatic acid, potassium binoxalate, butyl ether of ethylene glycol and mixtures of these.

2. The process as claimed in claim 1, wherein said anti-hardening agent is crystalline citric acid.

3. The process as claimed in claim 1, wherein said anti-hardening agent is malonic acid.

4. The process as claimed in claim 1, wherein said anti-hardening agent is malic acid.

5. The process as claimed in claim 1, wherein the weight of said anti-hardening agent is at least 2% of the weight of said plasticized nitrocellulose.

6. The process as claimed in claim 1, wherein said thermoplastic composition is extruded at a temperature between 80° and 115° C.

7. A thermoplastic composition suitable for the production of fuse of the kind having a coherent imperforate extruded core, said composition comprising a deflagrating mixture of a reducing agent and a lead compound thermally decomposable to yield products comprising lead monoxide and free oxygen, a non-detonating thermoplastic material including nitrocellulose colloided by a non-volatile plasticizer, and an anti-hardening agent for preventing hardening of said thermoplastic composition during extrusion, said anti-hardening agent being selected from the group consisting of a water soluble polycarboxylic aliphatic acid, potassium binoxalate, butyl ether of ethylene glycol and mixtures of these.

HENRYK ZENFTMAN.
JOSEPH E. FORLIN.

REFERENCES CITED

The following references are of record in the file of this patent:

UNITED STATES PATENTS

| Number | Name | Date |
| --- | --- | --- |
| 988,799 | Maxim | Apr. 4, 1911 |
| 1,805,214 | Hale | May 12, 1931 |
| 1,877,127 | Hale | Sept. 13, 1932 |
| 2,002,800 | Schrauth | May 28, 1935 |
| 2,118,506 | Graves | May 24, 1938 |
| 2,327,867 | Calhoun | Aug. 24, 1943 |
| 2,363,569 | Caldwell et al. | Nov. 28, 1944 |
| 2,396,074 | Barsky | Mar. 5, 1946 |